June 19, 1951             N. L. SIMMONS            2,557,576
PACKAGE FOR WHEY CONCENTRATE
AND OTHER DAIRY PRODUCTS
Filed Jan. 14, 1949                           2 Sheets-Sheet 2
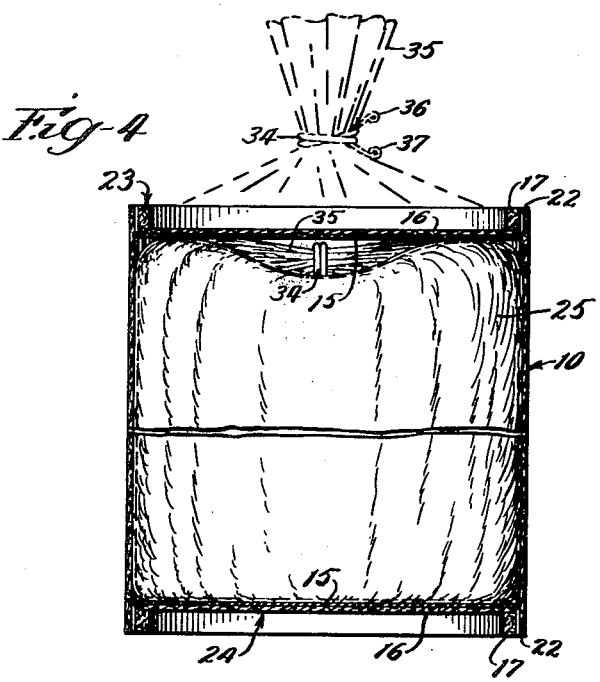
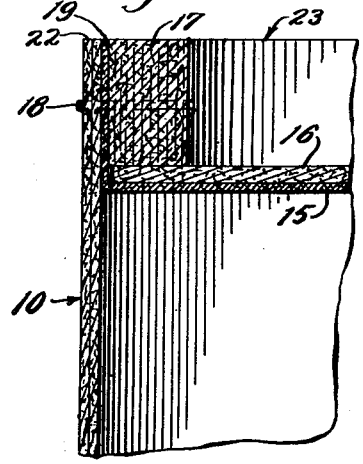
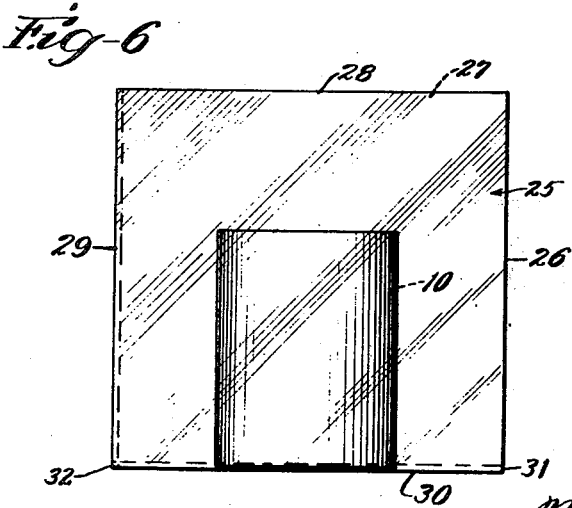
Inventor
Nicholas L. Simmons
By: Robert W. Fudt
Atty.

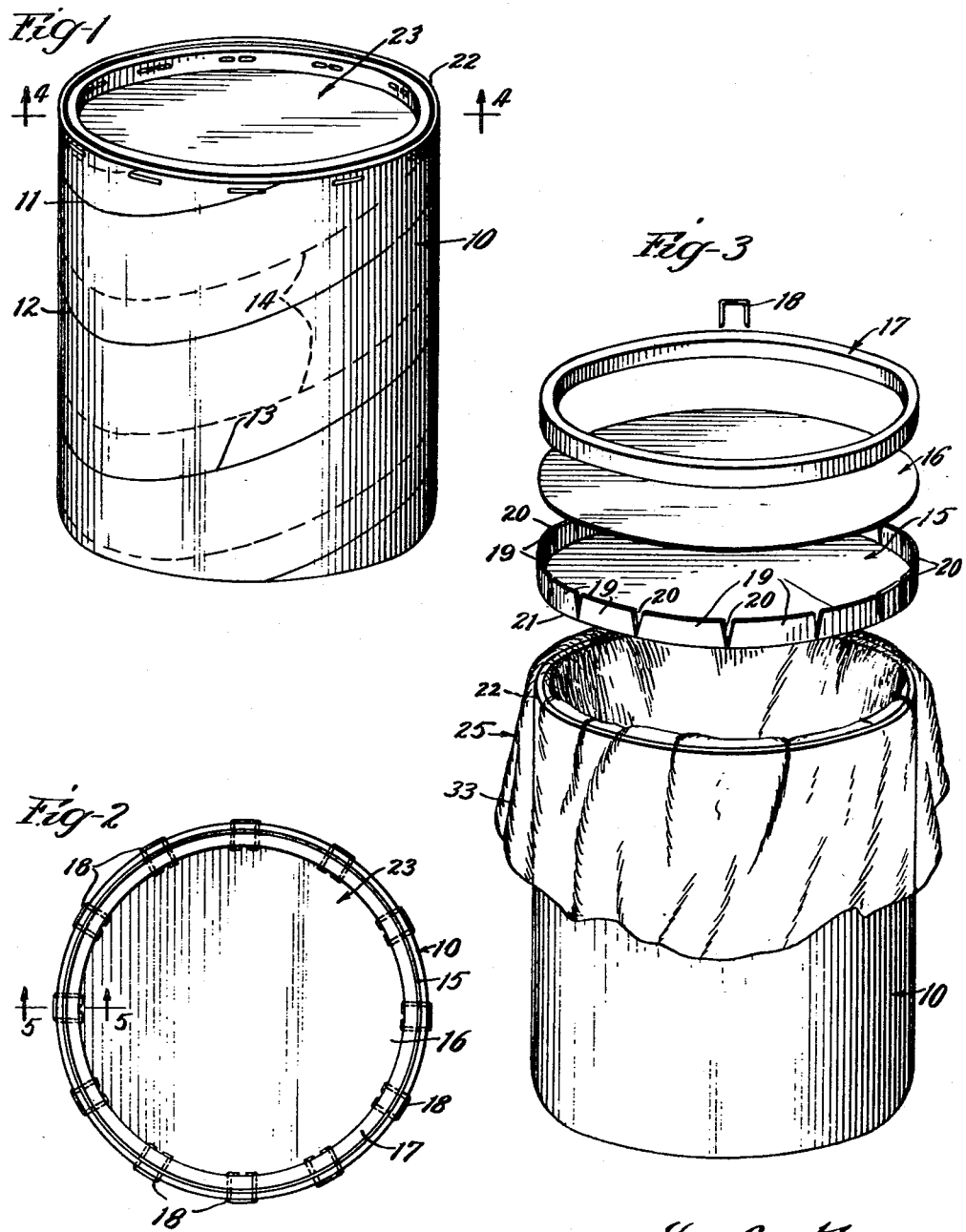

Patented June 19, 1951

2,557,576

UNITED STATES PATENT OFFICE 2,557,576

PACKAGE FOR WHEY CONCENTRATE AND OTHER DAIRY PRODUCTS

Nicholas L. Simmons, Chicago, Ill.

Application January 14, 1949, Serial No. 71,008

2 Claims. (Cl. 99—171)

The present invention relates to packages and methods of packaging for whey concentrates and other dairy products, and is particularly concerned with improved methods and an improved package, by means of which whey concentrate may be maintained in a fresh and edible condition for a long period of time.

The present application is a continuation-in-part of my prior application, Ser. No. 64,227, now abandoned filed December 8, 1948, under the same title.

Such whey concentrates are made out of the whey resulting from cheese processes, by removing most of the water from the whey and reducing it to a putty-like plastic. An exemplary analysis of such a whey concentrate is as follows:

| | |
|---|---|
| 38% milk sugar | ¼% fat |
| 12% lactic acid | Fiber, none |
| 8% milk protein | Moisture, 34% |
| 7¾% milk minerals | Total solids, 66% |

The vitamin content of such a concentrate may be as follows:

| | Mg. per lb. |
|---|---|
| Vitamin C | 12.24 |
| Riboflavin | 5.85 |
| Niacin | 2.83 |
| Choline | 580.6 |
| Pantothenic acid | 6.75 |

The packages of whey concentrate of the prior art were usually made of cardboard, which was painted or otherwise coated to resist moisture; but lactic acid of the whey concentrate penetrates through such painted or coated layers into the cardboard and spreads most rapidly, causing the entire package to deteriorate within about a week or less, so that the cardboard container falls apart.

One of the objects of the invention is the provision of an improved whey concentrate package in which the cardboard container is adequately protected from the lactic acid, so that the lactic acid is prevented from coming into contact with the cardboard.

Another object of the invention is the provision of an improved package which includes a bag constructed of a suitable plastic and having its inlet or outlet sealed against passage of air or moisture by means of a tie wire, so that germs or the air can gain no access to the whey concentrate, thus preventing molding or fermentation or any other deterioration over a substantial period of time.

Another object of the invention is the provision of an improved method of packaging whey concentrate by means of which a package may be made which is convenient to handle, ship and store; and by means of which the whey concentrate is enclosed in an air-tight and liquid-tight envelope, so that the acid constituents of the whey cannot attack the material of which the container is made; and the whey is also isolated from contact with the air, excluding germs, and preventing deterioration, fermentation, or growth of fungus, for a long period of time.

Another object of the invention is the provision of an improved package for whey, which is rigid and of regular shape so that it is easier to handle and ship, but which also includes a flexible air-tight and liquid-tight envelope of inert chemical material, which permits the plastic concentrate to conform to the interior shape of the package by contacts between the whey and the rigid container so as to protect the container from the action of the lactic acid and to maintain the product in a salable and sanitary condition for a long period of time.

Still another object is the provision of an improved rigid container for use in packaging edible dairy products, which container may be constructed without the use of any metal parts, so that it is easily disposable and so that there are no metal parts to get in the digestional tracts of animals, some of which tend even to eat parts of the container.

Another object of the invention is the provision of an improved disposable package which is constructed substantially entirely of paper, and which is more economical to manufacture, being substantially forty percent cheaper than packages of similar construction which have metal end covers, and which is adapted to be used for a long period of time for storing edible products without deterioration of either the package or product.

Other objects and advantages of the invention will be apparent from the following description and the accompanying drawings, in which similar characters of reference indicate similar parts throughout the several views.

Referring to the two sheets of drawings accompanying the specification:

Fig. 1 is a view in perspective of a whey concentrate package embodying my invention;

Fig. 2 is a top plan view of the package, which is exactly similar to a bottom plan view;

Fig. 3 is an exploded view in perspective of the package in position to receive the food product, and with the parts of the cover shown in the order in which they are applied to close the package;

Fig. 4 is a vertical sectional view, taken on the plane of the line 4—4 of Fig. 1, looking in the direction of the arrows;

Fig. 5 is a fragmentary sectional view, similar to Fig. 4, showing the details of construction of the cover and its attachment to the container;

Fig. 6 is an elevational view, showing the relative sizes of the rigid container and the flexible envelope, which is used inside the rigid container, the envelope in flat condition being superimposed upon a side elevation of the cylindrical container.

The whey concentrate for which the package is intended, being in a moist and plastic condition, presents a greater problem in packaging than any other material. Being intended for stock and poultry feeding, and being a dairy product, it must be maintained in a sanitary condition, yet the lactic acid tends to attack many metals and cardboard; and the cardboards which have been used soon become discolored and moist due to the attack of the lactic acid, so that those packages often fall to pieces within a short time, such as, for example, within a few days or a week.

The whey concentrate is not sufficiently rigid to be formed in blocks or bricks; but on the contrary, it conforms to the shape of the container in which it is placed. For convenient handling and shipment the container is preferably a rigid one and of maximum strength for the material employed, so that the container can be handled during shipment with a minimum amount of breakage.

Referring to Figs. 1 to 4, the container preferably consists of a substantially cylindrical member 10 of substantially rigid cardboard in tubular form of suitable size for storage and shipment. For example, in one embodiment of my invention the container is ten and one-half inches in diameter and fourteen inches long.

The cardboard of which the cylindrical container is made is preferably wrapped in spiral form, and is formed out of strips of multi-ply cardboard of uniform width, beveled at their end portions, as indicated at 11, and wrapped helically upon each other, with overlapping joints. Thus there is an external joint 12 between the external wrappings of cardboard and at 13.

The internal layers have their joint as indicated by the dotted line 14, and the cylindrical wall is built up of a plurality of plies of spirally wrapped cardboard, glued together with a suitable glue, preferably one which is insoluble in water.

The cardboard tube is preferably coated externally with a layer of paint and a waterproof varnish, such as, for example, a phenolic condensation compound varnish, by means of which the cardboard container 10 is substantially waterproof externally.

In some embodiments of the invention one end of the container may be made of cardboard and permanently closed; but I prefer to utilize a container, both ends of which are open, and which are provided with a pair of end closures 23, 24, of identical construction and characteristics.

For example, each end closure may consist of the elements shown in Fig. 3, which are a cup-shaped closure member 15, a rigid disc of cardboard 16, and a thick annular member of cardboard 17, with suitable fasteners, such as the staples 18, or stitching.

The cup-shaped closure 15 is of a size to be telescoped inside the end of the cylindrical container 10, and for purposes of economy it may consist of a disc, the outer edges of which are bent up in the form of a plurality of tabs 19, separated by the V-shaped slots 20.

The tabs 19 are substantially as wide in a direction extending radially before the tabs are bent, and axially after they are bent, as the width of the annular member 17 which the tabs are intended to overlap.

The diameter of the cup-shaped closure 15 at the line of bend 21 is substantially the inside diameter of the cylindrical container 10.

The rigid disc 16 preferably consists of a circular member of stiff cardboard, such as, for example, one-eighth of an inch in thickness; and it is this disc which provides the rigidity for the end of the container, and which also reinforces the container against lateral deformation at each of its ends. The disc 16 fits inside the cup-shaped member 15.

The annular member 17 serves as an end abutment for engaging the face of the cup-shaped member 15 and disc 16 and preventing their outward movement; and it also serves as a frictional securing means.

It also serves as a frictional engaging member for engaging inside the tabs 19 of the cup-shaped member, determining their cylindrical shape and size, and providing a pressure against the inside of the cylindrical container when the cover is forced into place.

The annular member 17 also reinforces the end of the container against deformation out of round, and it is preferably made up of a multiplicity of plies of the same cardboard as the container 10, and may be substantially thicker than the wall of the container, such as, for example seven sixteenths of an inch.

The present construction has the advantage that the entire container may be made out of cardboard; and the same machine which wraps the cylindrical containers 10 may be used to wrap the annular members 17, both of these being made in long lengths and cut off to suitable lengths by suitable rotating knives.

The assembly of the cover with the container 10 is as follows: The disc 16 is placed inside the cup-shaped member 15, and the annular member 17 is placed on the disc 16 inside the tabs 19. This makes an assembly which is large enough to have a tight frictional contact with the inside of the cylindrical container 10 into which this assembly is forced until the top of the annular member 17 is flush with the end 22 of the cylindrical container.

Then the tabs 19, annular member 17, and wall of container 10 are secured together by any suitable securing means, such as stitching or metal wire staples 18, which pass through all three of these members and are preferably clinched on the inside.

The stitching, which may be performed by machines of a type suitable for stitching soles, has the advantage that there will be no metal parts left that might get in the digestional tracts of animals.

The structure of the end closure may be the same for both ends of the container, one end being closed first, and the other being left to be closed after the food product is placed in the container.

The method of opening the container varies according to the method of its fastening. In the case of stitching, a knife blade may be inserted between the annular member 17 or cup-shaped member 15 and the inside of the wall of the container 10; and the parts of the stitches at this point may be cut off one after another, until the end closure can be removed.

In the case of staples, a small screw driver or blade may be inserted between the exposed part of the staple and the outside of the wall of container 10; and the staples having been removed, the entire end closure can be taken out. If desired, it is only necessary to cut with a knife blade inside the ring 17 through the disc 16 and cup-shaped member 15.

Thus either or both covers may be removed; and if desired, the cover may be removed in such manner that it can be replaced and the product used, and again covered up.

In order to protect the container from the lactic acid contained in the whey concentrate, the cardboard container 10 with its rigid covers 23 and 24 is preferably provided with an airtight and liquid-tight envelope 25 of tough flexible material, which is inert to acids and other chemical reagents; and such an envelope may be made of many different types of modern plastics. For example, the envelope shown is made of polyethylene.

This material has sufficient tensile strength to prevent rupture; and it has a very low water absorption, burns only slowly, is only slightly affected by sunlight, and is unaffected by acids or alkalis. It is inert with respect to metals, and may be caused to adhere to the same material by means of pressure and heat; but is otherwise not sticky or adherent under ordinary temperatures.

Other plastics that may be used are vinyl chloride-acetate resins, polyvinyl chloride resins, vinylidene chloride resins, rubber compounds, such as chlorinated rubber, or modified isomerized rubber, all of which are substantially unaffected by acids.

Referring to Fig. 6, this shows the relative proportions of the cylindrical container and the flexible envelope of a different shape from the container, but which is preferably employed on account of the simplicity of its manufacture and the convenience of its folding and packaging for shipment.

Such a container or envelope 25 may be made of a single sheet of the flexible resinous film, which is folded backward upon itself, thus providing one edge 26 with a U bend, while the upper two edges 27, 28 are open, and the other two edges 29, 30 are secured together by the application of pressure and heat along a very narrow contacting strip. Such an envelope can be folded like paper and stored or shipped with the greatest convenience.

It is also simple to manufacture; and labor, being a more important factor than material, may cost less than a smaller envelope of cylindrical shape conforming exactly to the shape of the inside of the rigid container 10.

The flexible envelope 25 is preferably much oversize with respect to the cylindrical rigid container 10 and may, for example, be 24 or 25 inches long and 24 or 25 inches wide from the edge 26 to the edge 29. Thus the circumference of such an oversized container when opened is from 75 to 78 inches, for example, while the circumference of the 11 inch diameter rigid container is only 34 to 35 inches.

The extra length of the flat flexible envelope permits part of its flat sides to bulge outward at the bottom of the cylindrical rigid container, the square corners 31, 32 wrinkling, and the flexible envelope substantially conforming to the shape of the inside of the cylindrical container, although the flexible envelope is of entirely different shape.

Thus the flexible envelope may be placed inside the rigid container and spread into position to conform substantially to the inner cylindrical shape of the container, with sufficient of the envelope left over to be turned down at 33 around the outside of the rigid container.

The semi-plastic whey concentrate may then be poured into the envelope and the rigid container substantially filled to a point within a short distance of its upper edge, after which the side walls of the envelope 25 may be drawn together and twisted tightly to form an air-tight closure. This may be effected by means of a tie wire 34 wrapped about the wrinkled and compressed upper end portion 35, and having its ends 36, 37 twisted together to constrict and compress the end portions 35 of the envelope tightly against each other.

In closing the end of the envelope the envelope is preferably drawn closely about the filling of concentrate, excluding substantially all of the air, and leaving such space as may be necessary outside of the envelope, but inside the rigid container. The folded portion 35 of the envelope may then be pressed downward and confined beneath the upper cover assembly 23, which is secured in place as described.

My method of packing whey concentrate comprises the provision of a substantially rigid open ended container; the placing of a flexible, liquid-and-air-tight envelope in said rigid container, with the edges of the envelope extending outwardly and downwardly over the upper edge of the rigid container; the filling of the envelope with whey concentrate to cause the envelope to conform substantially to the shape of the rigid container; the drawing together of the upper portions of the envelope closely about the concentrate to substantially exclude all air; the sealing of the open end of the envelope by means of a flexible metal tension member wrapped about the end of the envelope and secured in place; and the closure of the open end of the rigid container by means of a rigid cover engaging the upper end of the filling.

The method includes the making of the flexible envelope of an initially plastic material in the form of a film, which is tough and flexible and unaffected by water or acids, the envelope being of a flat two-sided construction, but sufficiently oversize with respect to the rigid container, so that the envelope may by wrinkling conform to and fill all of the space in the container.

The method also includes the formation of the open ended cylindrical container by wrapping a plurality of plies of cardboard spirally upon each other with overlapping joints and with glue between the plies, and the formation of the cover assembly.

The cover assembly is preferably made by providing a disc of cardboard, which is formed into cup shape by cutting V-shaped notches in its edge and bending up the portions between the notches to form a cup which has a frictional fit in the cylindrical container. The cup is then reinforced by placing a stiff cardboard disc inside it, and by providing a thick annular member of a multiplicity of plies of cardboard, also wrapped spirally and glued together, with overlapping joints to provide an end shoulder for resisting axial movement of the cover and for securing the cover assembly to the wall of the container.

The method includes the placing of the disc and the thick annular member inside the cup-shaped cardboard cover, the forcing of this assembly into the end of the cylindrical container, and the securement by securing means which passes through the wall of the container, the flanges on the cup-shaped member, and the thick annular member.

It will thus be observed that I have invented an improved package for whey concentrate, and other dairy products, of a plastic or semi-plastic nature, which has all of the desirable characteristics of a rigid container for convenient handling and packing one upon another. The container may be made of economical material which cannot be attacked by the water content or lactic acid content of the whey concentrate or other dairy product, because the latter is contained inside the rigid container in a liquid-tight and airtight flexible envelope.

Such a flexible envelope keeps the rigid container in a good condition by preventing it from becoming wet or soggy or attacked by lactic acid, while the rigid container protects the flexible envelope, there being a minimum amount of sliding or rubbing between the envelope and container because of the close filling of the container with the whey concentrate, thus preventing wear.

The flexible envelope also excludes air, germs, and fungus from the whey concentrate or other dairy products, and tends to prevent molding, fermentation, or other deterioration for a long period of time. The flexible envelope also keeps the product sanitary, excluding dust or dirt, which might find its way under the covers of the rigid container, and makes the product more salable because of the readily apparent sanitary condition of a product tightly enclosed in such an envelope and protected by such a rigid container.

The present package, consisting of a rigid container made entirely of boardboard, is easily disposable, which is a great advantage because such containers otherwise accumulate on the farm. The present container is also a great deal cheaper than any of the containers of the prior art, thus reducing the cost of the packaged product. Any reduction in the cost of the containers results in a material saving because the purchaser is primarily purchasing the food product and not the container, provided the container performs its function until the food product has been used.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a package for preserving a dairy product, the combination of a rigid cylindrical tubular member comprising a plurality of layers of cardboard helically wrapped with abutting side edges and the helical joints of one layer overlapping the helical joints of another layer, a cover member of cardboard for each end of said member, each cover having a flat cylindrical end wall and a cylindrical flange frictionally engaging said cylindrical member, and a flexible envelope of resinous film of acid resisting characteristics, said envelope having two plane sides of rectangular shape joined along three edges to form a flat bag, the said bag having a lateral dimension of more than twice the diameter of the cylindrical member, and the bag having a length of more than one and a half times the length of the cylindrical member, and the bag being located with its bottom in a closed end of said cylindrical member, and said bag wrinkling to engage said bottom and said cylindrical member when filled with a plastic dairy product, the bag end overlapping and depending from the top of the container during the filling, and being thereafter drawn together and tied and covered by the other cover of said tubular member.

2. A package for preserving a dairy product of the character described in claim 1, in which the said flexible envelope is constructed of a single sheet of polyethylene.

NICHOLAS L. SIMMONS.

REFERENCES CITED

The following references are of record in the file of this patent:

UNITED STATES PATENTS

| Number | Name | Date |
| --- | --- | --- |
| 224,563 | Verhage | Feb. 17, 1880 |
| 1,393,413 | Wallertz | Oct. 11, 1921 |
| 1,638,035 | Hulbert | Aug. 9, 1927 |
| 2,017,504 | Lohner | Oct. 15, 1935 |
| 2,099,257 | Bergstein | Nov. 16, 1937 |
| 2,350,912 | Marshall | June 6, 1944 |
| 2,383,352 | Snyder | Aug. 21, 1945 |
| 2,393,347 | Stuart et al. | Jan. 22, 1946 |

FOREIGN PATENTS

| Number | Country | Date |
| --- | --- | --- |
| 119,794 | Great Britain | Oct. 17, 1918 |

OTHER REFERENCES

"Scientific American," June 1947, page 258.